United States Patent
Ihle et al.

(10) Patent No.: US 9,321,689 B2
(45) Date of Patent: Apr. 26, 2016

(54) MOLDED OBJECT, HEATING DEVICE AND METHOD FOR PRODUCING A MOLDED OBJECT

(75) Inventors: Jan Ihle, Grambach (AT); Werner Kahr, Deutschlandsberg (AT); Bernhard Steinberger, Seiersberg (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 13/057,926

(22) PCT Filed: Jul. 24, 2009

(86) PCT No.: PCT/EP2009/059578
§ 371 (c)(1),
(2), (4) Date: Apr. 25, 2011

(87) PCT Pub. No.: WO2010/015531
PCT Pub. Date: Feb. 11, 2010

(65) Prior Publication Data
US 2011/0186711 A1    Aug. 4, 2011

(30) Foreign Application Priority Data

Aug. 7, 2008 (DE) .......................... 10 2008 036 836

(51) Int. Cl.
*H01C 7/02* (2006.01)
*F02M 53/06* (2006.01)
(Continued)

(52) U.S. Cl.
CPC ........... *C04B 35/4682* (2013.01); *C04B 37/001* (2013.01); *F02M 53/06* (2013.01); *H01C 7/025* (2013.01); *B28B 7/24* (2013.01); *C04B 2235/3262* (2013.01); *C04B 2235/656* (2013.01); *C04B 2235/6567* (2013.01); *C04B 2235/77* (2013.01); *C04B 2237/32* (2013.01); *C04B 2237/34* (2013.01); *C04B 2237/343* (2013.01);
(Continued)

(58) Field of Classification Search
CPC ............ B29C 33/04; B28B 7/24; B28B 7/42; F02M 31/16; F02M 53/06
USPC .................. 249/78–81, 114.1–116, 134–135; 239/133–136, 533.2; 123/549
See application file for complete search history.

(56) References Cited

U.S. PATENT DOCUMENTS 2,805,165 A * 9/1957 Goodman ...................... 501/135
3,044,968 A * 7/1962 Ichikawa ................. 252/519.12
(Continued)

FOREIGN PATENT DOCUMENTS

CN 1799286 7/2006
DE 929350 6/1955
(Continued)

OTHER PUBLICATIONS

Translation of Japanese Office Action of Japanese Patent Application No. 2014-7783 dated Jun. 3, 2015, submitted by the applicants Jul. 10, 2015.*

(Continued)

*Primary Examiner* — Yogendra Gupta
*Assistant Examiner* — Emmanuel S Luk
(74) *Attorney, Agent, or Firm* — Cozen O'Connor

(57) ABSTRACT

A mold (30), which has a first region (10) comprising an electroceramic material and a second region (20) comprising a structural ceramic material, is provided. A heating device with this mold is also specified. Furthermore, a method for producing a mold is provided.

7 Claims, 2 Drawing Sheets

(51) Int. Cl.
*B28B 7/24* (2006.01)
*C04B 35/468* (2006.01)
*C04B 37/00* (2006.01)
*F02M 31/16* (2006.01)

(52) U.S. Cl.
CPC ..... *C04B 2237/346* (2013.01); *C04B 2237/348* (2013.01); *F02M 31/16* (2013.01)

(56) References Cited

U.S. PATENT DOCUMENTS

| | | | |
|---|---|---|---|
| 3,637,532 A * | 1/1972 | Ramisch et al. | 252/520.1 |
| 3,996,168 A * | 12/1976 | Hoffmann et al. | 252/520.21 |
| 4,017,715 A * | 4/1977 | Whitney et al. | 219/553 |
| 4,035,613 A * | 7/1977 | Sagawa et al. | 219/552 |
| 4,096,098 A | 6/1978 | Umeya et al. | |
| 4,502,430 A | 3/1985 | Yokoi et al. | |
| 4,634,837 A | 1/1987 | Ito et al. | |
| 4,644,133 A | 2/1987 | Atsumi et al. | |
| 4,834,052 A | 5/1989 | Hori et al. | |
| 4,842,888 A | 6/1989 | Haluska et al. | |
| 4,960,736 A * | 10/1990 | Luxzsz et al. | 501/127 |
| 5,721,062 A * | 2/1998 | Kobayashi | 428/688 |
| 5,736,095 A | 4/1998 | Shimada et al. | |
| 5,756,215 A * | 5/1998 | Sawamura et al. | 428/446 |
| 6,019,931 A * | 2/2000 | Kashiwagi | B29C 33/02 249/78 |
| 6,071,465 A * | 6/2000 | Kobayashi | 264/605 |
| 6,144,286 A * | 11/2000 | Moos et al. | 338/22 R |
| 6,147,330 A * | 11/2000 | Ikeda et al. | 219/505 |
| 6,396,028 B1 | 5/2002 | Radmacher | |
| 6,669,796 B2 * | 12/2003 | Tokuda et al. | 156/89.12 |
| 7,595,975 B2 * | 9/2009 | Suzuki et al. | 361/321.4 |
| 7,854,975 B2 * | 12/2010 | Fujii | 428/34.4 |
| 2002/0013213 A1 * | 1/2002 | Sato et al. | 501/139 |
| 2002/0054932 A1 * | 5/2002 | Gellert | B23P 15/007 425/549 |
| 2002/0130318 A1 | 9/2002 | Kodama et al. | |
| 2005/0154110 A1 * | 7/2005 | Takaya et al. | 524/413 |
| 2006/0182908 A1 * | 8/2006 | Fujii | 428/34.4 |
| 2007/0069426 A1 * | 3/2007 | Kurita | H01F 41/0273 264/428 |
| 2007/0194016 A1 | 8/2007 | Dalton | |
| 2007/0295708 A1 | 12/2007 | Yu et al. | |
| 2008/0078493 A1 * | 4/2008 | Wei et al. | 156/64 |
| 2009/0146042 A1 * | 6/2009 | Ihle et al. | 249/78 |

FOREIGN PATENT DOCUMENTS

| | | | |
|---|---|---|---|
| DE | 1465439 | 7/1973 | |
| DE | 2753766 | 12/1977 | |
| DE | 2552127 | 6/1978 | |
| DE | 3820918 | 6/1988 | |
| DE | 68910231 | 3/1994 | |
| DE | 4340346 | 6/1995 | |
| DE | 4414284 | 10/1995 | |
| DE | 19818375 | 4/1998 | |
| DE | 19739758 | 6/1999 | |
| DE | 10012675 | 9/2001 | |
| DE | 10315220 | 10/2004 | |
| DE | 102005040685 | * 3/2007 | ............ H01C 17/28 |
| EP | 0356244 | 10/1993 | |
| EP | 0635993 | 1/1995 | |
| JP | 55146905 | 11/1980 | |
| JP | 55-165602 | 12/1980 | |
| JP | 60-014784 | 1/1985 | |
| JP | 60-86788 | 5/1985 | |
| JP | 60-216484 | 10/1985 | |
| JP | 01-068419 | * 3/1989 | ............... B22F 7/02 |
| JP | H02-97461 | 4/1990 | |
| JP | 02-278686 | 11/1990 | |
| JP | 03-054165 | 3/1991 | |
| JP | 03-257785 | 11/1991 | |
| JP | 04-042501 | 2/1992 | |
| JP | 04-206803 | 7/1992 | |
| JP | 04-233701 | 8/1992 | |
| JP | H04-247602 | 9/1992 | |
| JP | 05152057 | 6/1993 | |
| JP | 05-251206 | 9/1993 | |
| JP | H06-5181 | 1/1994 | |
| JP | 07-106055 | 4/1995 | |
| JP | 09-180907 | 7/1997 | |
| JP | 10-101413 | 4/1998 | |
| JP | 10-222005 | 8/1998 | |
| JP | 10-276826 | 10/1998 | |
| JP | 2003-181326 | 7/2003 | |
| JP | 2009-535789 | 10/2009 | |
| WO | WO 01/58212 | 8/2001 | |
| WO | WO 2007/130658 | 11/2007 | |
| WO | WO 2010/015525 | 2/2010 | |

OTHER PUBLICATIONS

E. Andrich, PTC-Thermistoren als selbstregelnde Heizelemente, *Philips Technische Rundschau*, 192-200 (1969).

International Search Report dated Nov. 17, 2009.

International Search Report dated Sep. 25, 2009 in related U.S. Appl. No. 13/057,938.

Office Action dated Jan. 8, 2014 issued in the corresponding Japanese Patent Application No. 2011-521520.

Final Office Action dated Feb. 9, 2014 issued in the related U.S. Appl. No. 13/057,938.

* cited by examiner

MOLDED OBJECT, HEATING DEVICE AND METHOD FOR PRODUCING A MOLDED OBJECT

PRIORITY CLAIM

This is a U.S. national stage of application No. PCT/EP2009/059578, filed on Jul. 24, 2009. Priority is claimed on the following application: Germany, Application No.: 10 2008 036 836.9 filed on Aug. 7, 2008, the content of which is incorporated here by reference.

BACKGROUND OF THE INVENTION

The invention relates to a mold, a heating device which comprises the mold and a method for producing a mold.

Media, for example fluids, can be heated by means of thermal contact with materials that have a positive temperature coefficient of the electrical resistance (PTC materials). Such PTC materials can so far be formed as sheets or rectangular elements that consist of a PTC material.

SUMMARY OF THE INVENTION

A problem to be solved is that of providing a mold that has a high mechanical strength and chemical stability and comprises a material with PTC properties. This problem is solved by a mold according to patent claim 1. Further embodiments of the mold, a heating device comprising a mold and a method for producing a mold are the subject of further patent claims.

According to one embodiment, a mold which comprises a first region, a second region and an interfacial region between the first region and the second region is provided. The first region has an electroceramic material with a positive temperature coefficient of the electrical resistance and the second region has a structural ceramic material. In the interfacial region, the electroceramic material and the structural ceramic material are sintered to one another. This provides a one-piece mold in which there is a composite of an electroceramic material and a structural ceramic material. Consequently, purely shaping components or shaping and functional components can be combined in one mold.

Furthermore, the electroceramic material of the first region of the mold may have a perovskite structure. The electroceramic material may have the structure $Ba_{1-x-y}M_xD_yTi_{1-a-b}N_aMn_bO_3$. In this case, x is chosen from the range 0 to 0.5, y from the range 0 to 0.01, a from the range 0 to 0.01, and b from the range 0 to 0.01. M may comprise a divalent cation, D a trivalent or tetravalent donor and N a pentavalent or hexavalent cation. M may be, for example, calcium, strontium or lead, and D may be, for example, yttrium or lanthanum. Examples of N are niobium or antimony. The electroceramic material may comprise metallic impurities that are present with a content of less than 10 ppm. The content of metallic impurities is so small that the PTC properties of the electroceramic material are not influenced.

The electroceramic material in the mold may also have a Curie temperature, which comprises a range from −30° C. to 340° C. Furthermore, the electroceramic material may have a resistivity at 25° C. which lies in a range from 3 Ωcm to 100 000 Ωcm.

As a result of the use of an electroceramic material with a positive temperature coefficient of the electrical resistance, the mold comprises the first region, which is heated by applying a voltage and can give off this heat to the surroundings. In this case, this region has a self-regulating behavior. If the temperature in the first region reaches a critical value, the resistance in this region also increases, so that less current flows through the first region. This prevents further heating-up of the first region, so that no additional electronic control of the heating power output has to be provided.

The structural ceramic material of the second region of the mold may comprise an oxide ceramic. The oxide ceramic may be chosen from a group which comprises $ZrO_2$, $Al_2O_3$ and MgO. The use of further oxide ceramics is possible as well. These oxide ceramics have high mechanical strength, for example with respect to abrasion, and a high chemical resistance, for example with respect to acids and bases. Furthermore, they are suitable for food contact applications and can without any hesitation be brought into contact with materials, for example media to be heated, that must not be contaminated.

If the mold is used for example in a heating device, the second region of the mold may be molded in such a way that it is present at locations where it is in contact with the medium to be heated and/or where a high degree of abrasion occurs.

This provides a mold in which there is a separation between the electrical function in the first region and the mechanically stable structural component in the second region.

Furthermore, the mold can be produced by means of injection molding, and consequently can be molded in any geometric form that is necessary for the respective structural surroundings. If the mold is used in a heating device, the first region can consequently be molded in such a way that it can be arranged in regions of the structure that are difficult to access. In this way, for example, a medium can be heated efficiently with very short heating-up times and low heating power outputs.

Furthermore, the first region, the second region and the interfacial region may have coefficients of thermal expansion that differ from one another by less than $2*10^{-6}$/K. This in effect chooses a material combination that has suitable phases in the interfacial region between the first region and the second region. "Phases" may comprise mixed crystals of the electroceramic and structural ceramic materials. Such mixed crystals may be, for example, barium-lead-zirconium titanates if zirconium oxide is chosen as the structural ceramic material. In the case of $Al_2O_3$ or MgO as the structural ceramic material, the mixed crystals may correspondingly be barium-aluminum titanate or barium-magnesium titanate. Depending on the distance from the first region and the second region, the mixed crystals pass fluently into the electroceramic material and the structural ceramic material. "Suitable" means in this context that the interfacial region has coefficients of expansion similar to the adjacent regions. The coefficients of expansion of the materials used in the first region, second region and the interfacial region may be adapted to one another in such a way that no stress cracks form under heating.

Furthermore, the interfacial region of the mold may inhibit the diffusion of constituents of the electroceramic material and of the structural ceramic material. Constituents may be, for example, anions or cations that are present in the electroceramic material or the structural ceramic material. This avoids mutual impairment of the functional and/or structural properties of the first and second regions.

Also provided is a heating device which comprises a mold with the aforementioned properties. The heating device may comprise the mold on which electrical contacting areas for producing a current flow in the mold are arranged. In this case, the first region of the mold may be provided with the electrical contacting areas. This produces the current flow in the first region of the mold.

With a heating device which comprises a first, functional region and a second, structural region, the separation of medium to be heated and the electroceramic material can be realized. This allows the regions of the heating device that are subjected to mechanical and/or abrasive loads to be isolated from the electrical function. The use of the structural ceramic material in the second region also allows media that must not be contaminated to be heated. Dissolving of constituents of the first region by the medium to be heated is also prevented, by the second region being present between the first region and the medium to be heated.

Also provided is a method for producing a mold. The method comprises the method steps of A) providing an electroceramic starting material,
B) providing a structural ceramic starting material,
C) producing a green body, which comprises a first region, comprising the electroceramic starting material, and a second region, comprising the structural ceramic starting material, and
D) sintering the green body to produce the mold, the electroceramic starting material being transformed into an electroceramic material with a positive temperature coefficient of the electrical resistance.

With this method, a one-piece mold that has regions with functional properties and with structural properties can be provided in a molding process. The joint production of these regions avoids having to produce a number of individual components and fasten them to one another with form-fitting engagement. The joint molding and joint debinding and sintering of the electroceramic starting material and the structural ceramic starting material have the effect that at least two regions that have the desired electrical and mechanical properties are formed in a mold, are arranged in form-fitting engagement and are sintered to one another.

In method step A), an electroceramic starting material which has a structure having the formula $Ba_{1-x-y}M_xD_yTi_{1-a-b}N_aMn_bO_3$ can be provided. In this case, x comprises the range 0 to 0.5, y the range 0 to 0.01, a the range 0 to 0.01, b the range 0 to 0.01, M a divalent cation, D a trivalent or tetravalent donor and N a pentavalent or hexavalent cation. This starting material can be transformed into an electroceramic material with a positive temperature coefficient of the electrical resistance and has a perovskite structure.

In order to produce the electroceramic starting material, with less than 10 ppm of metallic impurities, it can be produced with molds which have a hard coating in order to avoid abrasion. A hard coating may, for example, consist of tungsten carbide. All the surfaces of the molds that come into contact with the electroceramic starting material may be coated with the hard coating.

In this way, an electroceramic starting material that can be transformed into an electroceramic PTC material by sintering can be mixed with a matrix and processed to form granules. These granules can be injection-molded for further processing.

The matrix in which the electroceramic starting material is incorporated and which has a lower melting point than the electroceramic starting material may in this case make up a proportion of less than 20% by mass with respect to the electroceramic starting material. The matrix may comprise a material chosen from a group which comprises wax, resins, thermoplastics and water-soluble polymers. Further additives, such as antioxidants or plasticizers, may likewise be present.

Furthermore, in method step B), the structural ceramic starting material can be mixed with a matrix and processed to form granules which can be injection-molded for further processing.

The matrix in which the structural ceramic starting material is incorporated and which has a lower melting point than the structural ceramic starting material may in this case make up a proportion of less than 20% by mass with respect to the structural ceramic starting material. The matrix may comprise a material chosen from a group which comprises wax, resins, thermoplastics and water-soluble polymers. Further additives, such as antioxidants or plasticizers, may likewise be present.

During the sintering in method step D), the electroceramic starting material is transformed into the electroceramic material of the mold that has a positive temperature coefficient of the electrical resistance and the structural ceramic starting material is transformed into the structural ceramic material of the mold and the matrix is removed.

A material which can be transformed by sintering into an oxide ceramic chosen from a group which comprises $ZrO_2$, $Al_2O_3$ and MgO may be chosen as the structural ceramic starting material.

When choosing the electroceramic starting material and the structural ceramic starting material, a suitable match should be found between the molding properties and the sintering conditions. For example, the materials should be sintered with similar maximum temperatures, holding times and cooling gradients. In order to realize joint sintering of the electroceramic starting material and the structural ceramic starting material in the same process, the sintering temperature can be increased in the case of the electroceramic starting material and lowered in the case of the structural ceramic starting material by suitable measures. Suitable measures are, for example, adding oxides with calcium, strontium, lead or zirconium to the electroceramic starting material or adding oxides with elements from the group of alkalis, alkaline earths, titanium oxide or silicon oxide, for example oxides with yttrium, calcium or cerium, to the structural ceramic starting material. This allows the physical parameters of the electroceramic starting material and of the structural ceramic starting material to be modified in such a way that a common process window can be achieved for processing the two materials.

In method steps A) and B), for example, the electroceramic starting material and the structural ceramic starting material can be chosen such that they have coefficients of expansion which differ by less than $2*10^{-6}/K$. In the joint sintering in method step D), an interfacial region in which the electroceramic material and the structural ceramic material are sintered with one another is formed between the two materials. For this purpose, excessive amounts of low-melting eutectics should not be formed in the interfacial region during the sintering. In this way, sufficient stability of the form of the mold is ensured.

In method step C), a molding method chosen from injection molding, multilayer extrusion and film casting may be used. By means of injection molding, for example, it is possible to provide molds in any desired forms, which can be adapted to the respective conditions and structural surroundings.

BRIEF DESCRIPTION OF THE DRAWINGS

The invention will be explained in still more detail on the basis of the figures and exemplary embodiments.

DETAILED DESCRIPTION OF THE PRESENTLY PREFERRED EMBODIMENTS

Figure 1:
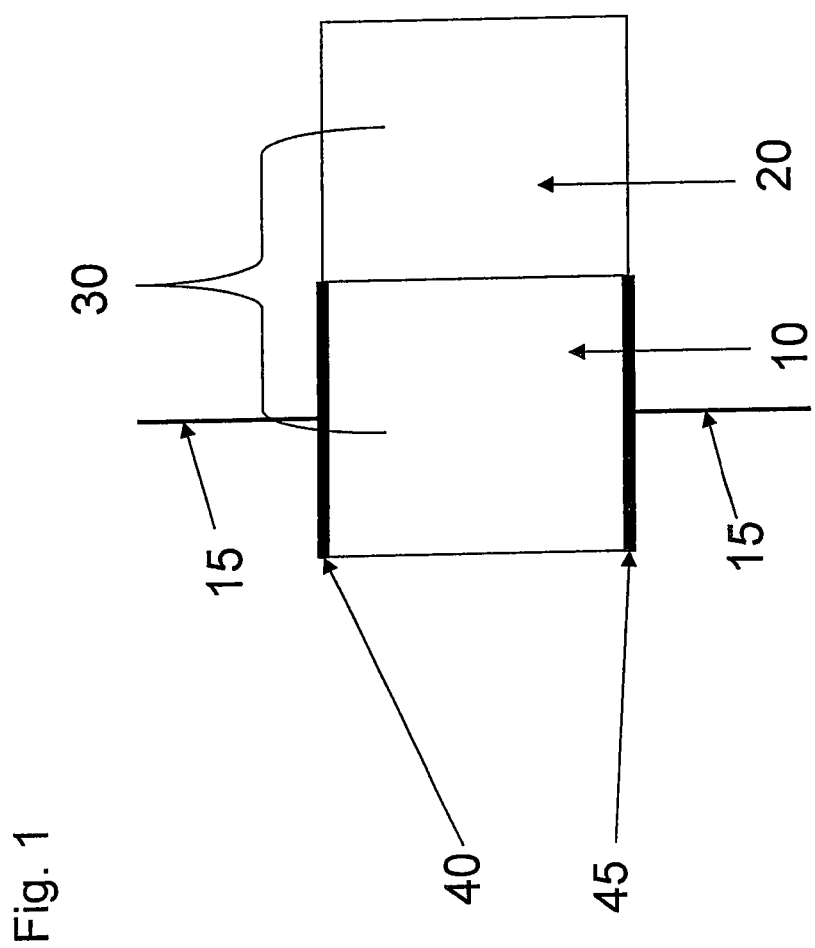
FIG. 1 shows the schematic side view of an embodiment of a heating device.

FIG. 1 shows the schematic side view of a first embodiment of a heating device. This comprises a first region 10 and a second region 20, which together form the mold 30. Arranged on the first region 10 are two electrical contacting areas 40 and 45, which can be contacted by way of electrical terminals 15. The first region 10 and the second region 20 are sintered to one another, so that additional fastening of the two regions to one another is not necessary and the mold 30 is formed as one piece.

The region 10 comprises an electroceramic material of the structure $Ba_{1-x-y}M_xD_yTi_{1-a-b}N_aMn_bO_3$, which furthermore may be doped with a rare earth, such as for example calcium, strontium, lead or zirconium. With this electroceramic material, the first region has a positive temperature coefficient of the electrical resistance.

The second region 20 may comprise a structural ceramic material, for example an oxide ceramic, which likewise may be doped with elements from the group of alkalis, alkaline earths, titanium or silicon, for example yttrium, calcium or cerium.

In this way, the mechanical and chemical load-bearing capabilities of the structural ceramic material are combined with the electrical functionality of the electroceramic material in a one-piece mold 30. In the production of the mold 30, a joint joining process (CIM, Ceramic Injection Molding) is used to bond together the electroceramic and structural ceramic materials that have been made to match one another in their coefficients of thermal expansion. The coefficients of thermal expansion must in this case have differences less than $2*10^{-6}/K$, which can be achieved by the appropriate dopings of the materials, over the entire temperature range from 1260° C., where there is a mixture of solid $BaTiO_3$ and liquid $BaTiSiO_5$, to room temperature, that is to say even below the liquid-phase sintering temperature. According to the composition, liquid phases of the electroceramic and structural ceramic materials may occur at temperatures from 940° C. to 1670° C.

In the critical temperature range with great stresses, the ceramic materials should be cooled slowly, for example by 0.2° C. per minute. The critical temperature range may in this case lie between room temperature and 1260° C.

In order to achieve sintering capabilities up to densities of 99% of the structural ceramic material, grain sizes of less than 1 μm before the sintering process, or sintering aids, such as for example $SiO_2$, $TiO_2$ or FeO, may be used. In this way, sintering temperatures of less than 1400° C. are possible with sintering times of less than 120 minutes.

If the electroceramic materials comprise amounts of lead, very low sintering temperatures below 1300° C. can be used to prevent enrichment of the lead in the structural ceramic material.

Amounts of binder in the electroceramic and/or structural ceramic material as well as pressing or joining forces are set to similar shrinkage values during the debinding and sintering, which leads to amounts of binder of over 1% by weight.

Figure 2:
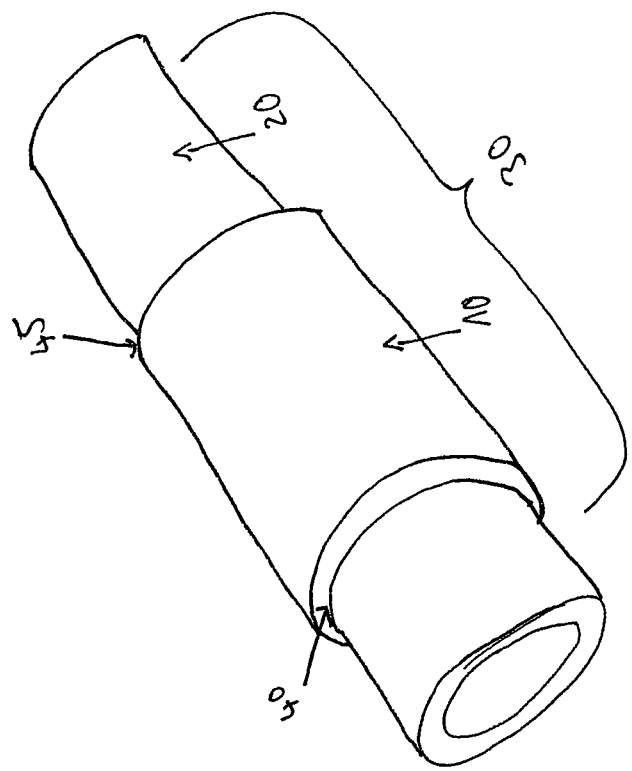
FIG. 2 shows the schematic, perspective view of a second embodiment of a heating device.

FIG. 2 shows the schematic perspective view of a further embodiment of the heating device. Here, the first region 10 and the second region 20, which together form the mold 30, are formed as a pipe, the first region 10 surrounding the second region 20. On both end faces of the first region 10 there are electrical contacting areas 40 and 45. The electrical terminals 15, by way of which the contacting areas 40 and 45 are contacted, are not shown here for the sake of overall clarity. Through such a pipe there may be passed, for example, a medium that is heated when a voltage is applied through the first region, while the second region 20 provides the mechanical and chemical stability of the mold 30 during the flowing of the medium through the pipe. Contamination of the medium to be heated or destruction of the first region by the medium are inhibited, since the second region 20 is present between the medium to be heated and the first region 10.

The embodiments shown in the figures and exemplary embodiments can be varied as desired. It should also be taken into consideration that the invention is not restricted to the examples but allows further refinements that are not specified here.

LIST OF DESIGNATIONS 10 first region
15 electrical terminal
20 second region
30 mold
40 electrical contacting area
45 electrical contacting area

The invention claimed is:

1. A mold for heating a medium, comprising:
a first region, which has an electroceramic material with a positive temperature coefficient of an electrical resistance and having a perovskite structure and a Curie temperature, which comprises a range from −30° C. to 340° C.;
a second region, which has a structural ceramic material; and
between the first region and the second region, an interfacial region, in which the electroceramic material and the structural ceramic material are sintered to one another, wherein the first region surrounds the second region in a form-fitting engagement for defining said mold as a hollow mold,
wherein the first region is adapted to be heated by applying a voltage to electrical contact areas of the first region, and
wherein the second region is present between the first region and the medium to be heated.

2. The mold of claim 1, wherein the electroceramic material has the structure $Ba_{1-x-y}M_xD_yTi_{1-a-b}N_aMn_bO_3$, where x=0 to 0.5, y=0 to 0.01, a=0 to 0.01, b=0 to 0.01, M comprises a divalent cation, D comprises a trivalent or tetravalent donor, and N comprises a pentavalent or hexavalent cation.

3. The mold of claim 1, wherein the electroceramic material has a resistivity at 25° C. which lies in a range from 3 Ωcm to 100,000 Ωcm.

4. The mold of claim 1, wherein the structural ceramic material comprises an oxide ceramic.

5. The mold of claim 4, wherein the oxide ceramic is chosen from a group which comprises $ZrO_2$, $Al_2O_3$ and MgO.

6. The mold of claim 1, wherein the first region, the second region and the interfacial region have coefficients of thermal expansion that differ from one another by less than $2*10^{-6}/K$.

7. The mold of claim 1, wherein the interfacial region inhibits the diffusion of constituents of the electroceramic material and of the structural ceramic material.

* * * * *